(12) United States Patent
Kajiwara

(10) Patent No.: US 7,088,529 B2
(45) Date of Patent: Aug. 8, 2006

(54) COMPOSITE LENS SYSTEM, AND LENS UNIT PROVIDED WITH SUCH COMPOSITE LENS SYSTEM, AS WELL AS IMAGE PICKUP DEVICE PROVIDED WITH SUCH LENS UNIT

(75) Inventor: Yasushi Kajiwara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/023,867

(22) Filed: Dec. 28, 2004

(65) Prior Publication Data

US 2006/0139771 A1   Jun. 29, 2006

(51) Int. Cl.
*G02B 27/10* (2006.01)

(52) U.S. Cl. ...................................... 359/811
(58) Field of Classification Search ........ 359/811–813, 359/819, 821–823; 396/529–531

See application file for complete search history.

(56) References Cited

U.S. PATENT DOCUMENTS

2002/0141079 A1 * 10/2002 Onda .......................... 359/819
2004/0130807 A1 * 7/2004 Hattori et al. .............. 359/811

* cited by examiner

*Primary Examiner*—Alicia M Harrington
(74) *Attorney, Agent, or Firm*—Koda & Androlia (57) ABSTRACT

The present invention provides a composite lens system, a lens unit and an image pickup device, wherein the productivity is enhanced, while maintaining an optical performance, by achieving an axis-aligning adjustment for the composite lens system easily and appropriately. The positioning of adjacent lenses in a direction of optical axes is achieved by bringing optically non-functioning faces of the adjacent lenses into engagement with each other directly or indirectly with another member interposed therebetween. The lenses have adjusting faces which are formed thereon, so that angles formed by the lenses with respect to the optical axes are different from each other, and which are used for an axis-aligning adjustment for the lenses. The axis-aligning adjustment is achieved by an adjusting member disposed to engage both the adjusting faces of the adjacent lenses.

16 Claims, 11 Drawing Sheets

COMPOSITE LENS SYSTEM, AND LENS UNIT PROVIDED WITH SUCH COMPOSITE LENS SYSTEM, AS WELL AS IMAGE PICKUP DEVICE PROVIDED WITH SUCH LENS UNIT

BACKGROUND OF THE INVENTION

1. Field of the Invention

The present invention relates to a composite lens system and a lens unit provided with such composite lens system, as well as an image pickup device provided with such lens unit, and more particularly, to a composite lens system comprising a plurality of lenses which are disposed adjacent one another in a direction of their optical axes aligned with one another by an axis-aligning adjustment.

2. Description of the Related Art

Figure 1:
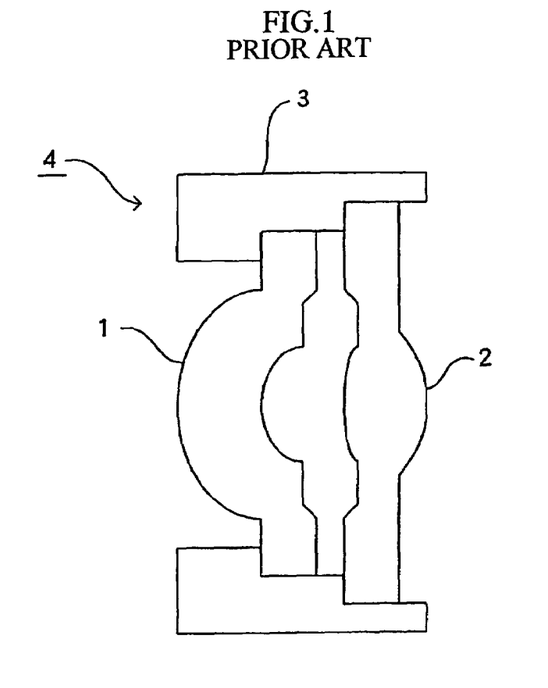
FIG. 1 is a vertical cross-sectional view showing one example of a conventional composite lens system.

A lens unit 4 including a plurality of (two in FIG. 1) lenses 1 and 2 and another optical part such as a diaphragm within a mirror tube 3, as shown in FIG. 1, has been conventionally used in an image pickup device such as an image pickup camera.

To assemble the lens unit 4 of this type, a process for press-fitting the optical parts 1 and 2 sequentially into the mirror tube 3, beginning with the optical lens 1 which is to be located deeper in the mirror tube 3, as shown in FIG. 1, is conventionally employed in some cases.

When such a process is employed, however, during press-fitting of the first optical part 1 into the mirror tube 3, a sidewall of the mirror tube 3 may be widened, and as a result, the inside diameter of the mirror tube 3 may be slightly deviated from an original design dimension.

This brings about a disadvantage that the second and subsequent optical parts 2 cannot be press-fitted into predetermined locations in the mirror tube 3 and as a result, the positional relationship between the optical parts 1 and 2 is unbalanced, thereby causing the degradation of the optical characteristics of the lens unit 4.

An engagement portion for a body of an image pickup device such as a threaded portion may be formed on an outer peripheral surface of the mirror tube 3. However, when the sidewall of the mirror tube 3 is widened by the press-fitting of the optical part 1 as described above, the outside diameter of the mirror tube 3 may be deviated from an original design dimension, whereby the size of the engagement portion may be also deviated. This causes a disadvantage that the lens unit 4 cannot be engaged appropriately with the body of the image pickup device and thus, is not available as a product.

Therefore, if a plurality of lenses are accommodated in the form of a composite lens system comprising an integral combination these lenses and as required, another optical part, instead of the lenses 1 and 2 being accommodated individually into the mirror tube 3, the above-described disadvantage can be avoided effectively.

However, if the optical parts are merely bonded together, an optical error such as a misalignment between the optical exes of the optical parts may be produced. Therefore, if the optical parts are disposed in an arrangement in which such an error can be eliminated, it is possible to form a composite lens system in which even if the performances of the individual lenses are different from each other, the error can be absorbed to exhibit an appropriate optical performance.

From such a background, various proportions have been made for a lens system in which optical axes of lenses are aligned with each other or with another optical part such as a diaphragm or with a center axis of a mirror tube by an axis-aligning adjustment.

However, the prior art is accompanied by a problem that the axis-aligning adjustment for the optical parts cannot be conducted at a stage of fabrication of a composite lens system, a lot of labor are required for the axis-aligning adjustment and thus, it is impossible to enhance the productivity of a product.

In a case of a lens system in which tapered portions of lenses are brought into abutment against each other for an axis-aligning adjustment, for example, as in a lens system described in Japanese Patent Application Laid-open No.2002-196211, each of the lenses must be formed at an extremely high dimensional accuracy and hence, it is difficult to manufacture the lens system and it is impossible to enhance the productivity.

In a case of a lens system in which a plurality of optical parts are press-fitted sequentially into a mirror tube for an axis-aligning adjustment for the optical parts, as in a lens system described in Japanese Patent Application Laid-open No.2002-286987, it is necessary to determine sizes of the mirror tube and the optical parts at a high accuracy, so that an appropriate press-fitting margin is ensured, on the assumption that the mirror tube is deformed by the press-fitting of the lenses, as described above. For this reason, it is likewise difficult to manufacture the lens system and it is impossible to enhance the productivity.

Further, a lens system described in Japanese Patent Application Laid-open No.2001-344806 is a light pickup lens system and is different in basic arrangement from a lens for an image pickup device. Moreover, in this lens system, an axis-aligning adjustment for lenses cannot be achieved, if they are not in a unit state. Further, the positioning of the lenses in directions of optical axes cannot be conducted univocally and hence, the axis-aligning adjustment is rather complicated.

Yet further, in a case of a lens system in which an axis-aligning adjustment for lenses is conducted after press-fitting of the lenses into a mirror tube, the examination of the optical performance can be conducted only at the time of completion of the assembling of the lenses. As a result, the yield cannot be enhanced, and it is difficult to examine the cause of a failure of assembling and hence, it is further difficult to enhance the productivity.

It is an actual circumstance that there are no effective proposals conventionally made for composite lens systems in which the productivity has been enhanced, while maintaining an optical performance high.

SUMMARY OF THE INVENTION

The present invention has been accomplished with such points in view, and it is an object of the present invention to provide a composite lens system wherein an axis-aligning adjustment for optical parts can be achieved easily and appropriately at a stage of fabrication of the composite lens system, thereby enhancing the productivity, while maintaining an optical performance, and a lens unit provided with such composite lens system, as well as an image pickup device provided with such lens unit.

To achieve the above object, according to a first aspect and feature of the present invention., there is provided a composite lens system comprising a plurality of lenses which are disposed adjacent one another in a direction of their optical axes aligned with one another by an axis-aligning adjustment, wherein adjacent two of the plurality of lenses have optically non-functioning faces which are formed thereon to abut against each other directly or with another member interposed therebetween, whereby the positioning of the adjacent lenses in the direction of the optical axes is achieved, and the plurality of lenses have adjusting faces which are formed thereon, so that angles formed by the adjacent lenses with respect to the optical axes are different from each other, and which are used for an axis-aligning adjustment for the adjacent lenses, the axis-aligning adjustment being achieved by an adjusting member disposed to engage both the adjusting faces of the adjacent lenses.

With the first feature of the present invention, it is possible to realize the composite lens system in which the axis-aligning adjustment for the optical parts has been achieved easily and appropriately at a stage of fabrication of the composite lens system by bringing the adjusting member into engagement with the adjusting member, while univocally conducting the positioning of the lenses in the direction of the optical axes.

When an offset amount between the optical axes peculiar to lens-producing conditions in a mold or the like for forming the lenses can be defined, for example, using a statistical technique, the axis-aligning adjustment can be achieved univocally by only locating the adjusting member in a predetermined position between the adjusting faces by previously subjecting the lenses to a padding treatment for compensating for the offset amount at a subsequent producing step after the offset amount between the optical axes of the lenses under such producing conditions has been once defined using the adjusting member. Such univocal axis-aligning adjustment can be also realized by previously forming a portion for compensating for the offset amount on the adjusting member itself, or by disposing a spacer separate from the lenses for compensating for the offset amount on the adjusting faces.

The expression "when the offset amount between the optical axes peculiar to the lens-producing conditions can be defined" means a case where, if the lenses constituting the composite lens system have been formed under particular producing conditions (in a mold or the like), an only offset amount corresponding to the particular producing conditions are regarded as being generated upon assembling of the lenses into the composite lens system (and so on).

According to a second aspect and feature of the present invention, in addition to the first feature, one of the adjacent lenses has an extension formed thereon outside its optically functioning face to extend toward the other of the adjacent lenses along the optical axis; the adjusting face of the one lens is formed around an inner peripheral surface of the extension; at least a portion of an outer peripheral surface of the other lens is located inside the extension; the adjusting face of the other lens is formed at least at a portion of such outer peripheral surface inside the extension; and the adjusting member is interposed between the adjusting face of the one lens and the adjusting face of the other lens.

With the second feature of the present invention, in addition to the first feature, the size of a section of the adjusting member perpendicular to a circumferential direction can be reduced, thereby realizing a more compact arrangement.

According to a third aspect and feature of the present invention, in addition to the first feature, one of the adjacent lenses has a plurality of extensions formed thereon outside its optically functioning face at predetermined distances circumferentially from one another to extend toward the other of the adjacent lenses along the optical axis; adjusting faces of the one lens are formed on outer peripheral surfaces of these extensions; a plurality of projecting edges are formed on the other lens outside its optically functioning face and each located between the adjacent extensions of the one lens; adjusting faces of the other lens are formed around outer peripheral surfaces of the projecting edges; and the adjusting member is fitted around outer peripheral surfaces of the adjusting faces of the one lens and the adjusting faces of the other lens.

With the third feature of the present invention, stresses applied to the lenses can be maintained uniformly by the adjusting member, whereby the more stable axis-aligning adjustment can be achieved.

According to a fourth aspect and feature of the present invention, in addition of any of the first to third features, the adjusting member is an annular member disposed in contact with both the adjacent lenses.

With the fourth feature of the present invention, the axis-aligning adjustment for the optical parts can be achieved appropriately by adjusting the inclination of the annular member and hence, can be achieved further easily and inexpensively by a simple arrangement.

According to a fifth aspect and feature of the present invention, in addition to any of the first to third features, the adjusting member is a sleeve disposed in contact with both the adjusting faces of the adjacent lenses.

With the fifth feature of the present invention, the axis-aligning adjustment for the optical parts can be achieved appropriately by adjusting the inclination of the sleeve and hence, can be achieved further easily and inexpensively by a simple arrangement.

According to a sixth aspect and feature of the present invention, in addition to the fourth feature, the adjusting member has a projection disposed to abut against that portion of the optically non-functioning face of the lens perpendicular to the optical axis, which faces the adjusting member.

With the sixth feature of the present invention, when the offset amount between the optical axes peculiar to the lens-producing conditions can be defined, the axis-aligning adjustment can be achieved univocally by only locating the adjusting member formed with the projection for compensating for the offset amount in a predetermined position between the adjusting faces at a subsequent producing step after the offset amount between the optical axes of the lenses under such producing conditions has been once defined using the adjusting member (which is still not provided with the projection). As a result, the efficiency for producing the composite lens system can be further enhanced.

According to a seventh aspect and feature of the present invention, in addition to any of the fourth to sixth features, the adjusting member is annular in planar shape with an opening provided in part.

With the seventh feature of the present invention, in the adjustment of the adjusting member, the adjusting member can be easily elastically deformed by a predetermined amount along the shape of the adjusting member, as compared with a case of an adjusting member provided with no opening. Therefore, the axis-aligning adjustment for the optical parts can be achieved with a higher accuracy.

According to an eighth aspect and feature of the present invention, there is provided a composite lens system comprising a plurality of lenses which are disposed adjacent one another in a direction of their optical axes aligned with one another by an axis-aligning adjustment, wherein adjacent two of the plurality of lenses have optically non-functioning faces which are formed thereon to abut against each other directly or with another member interposed therebetween, whereby the positioning of the adjacent lenses in the direction of the optical axes is achieved, and the plurality of lenses have adjusting faces which are formed thereon, so that angles formed by the adjacent lenses with respect to the optical axes are different from each other, and which are used for an axis-aligning adjustment for the adjacent lenses.

With the eighth feature of the present invention, it is possible to realize the composite lens system in which the axis-aligning adjustment for the optical parts has been achieved easily and appropriately at a stage of fabrication of the composite lens system by bringing the adjusting member into engagement with the adjusting member, while univocally conducting the positioning of the lenses in the direction of the optical axes.

When an offset amount between the optical axes peculiar to lens-producing conditions in a mold or the like for forming the lenses can be defined, for example, using a statistical technique, the axis-aligning adjustment can be achieved univocally by only locating the adjusting member in a predetermined position between the adjusting faces either by previously subjecting the lenses to a padding treatment for compensating for the offset amount, or by previously forming a portion for compensating for the offset amount on the adjusting member itself, or by disposing a spacer separate from the lens for compensating for the offset amount at a subsequent producing step after the offset amount between the optical axes of the lenses under such producing conditions has been once defined using the adjusting member. Thus, the efficiency for producing the lenses can be further enhanced.

It should be noted that a composite lens system including no adjusting member in a final product state can be produced either by removing the adjusting member from the adjusting faces after bonding of the optical parts, or by using the adjusting member to the bitter end only when the offset amount between the optical axes is defined, or by mounting another member for compensating for the offset amount between the adjusting faces at a state of an actual mass production.

According to a ninth aspect and feature of the present invention, there is provided a composite lens system comprising a plurality of lenses which are disposed adjacent one another in a direction of their optical axes aligned with one another by an axis-aligning adjustment, wherein the plurality of lenses are positioned in the direction of the optical axes of the adjacent lenses by bringing optically non-functioning faces of the adjacent lenses into abutment against each other directly or indirectly with another member interposed therebetween, and have adjusting faces formed thereon and used for the axis-aligning adjustment for the adjacent lenses, the axis-aligning adjustment being achieved by a sleeve engaged with both the adjusting faces of the adjacent lenses.

With the ninth feature of the present invention, it is possible to realize the composite lens system in which the axis-aligning adjustment for the optical parts has been achieved easily and appropriately at a stage of fabrication of the composite lens system by bringing the sleeve into engagement with the adjusting faces, while conducting the positioning of the lenses in the direction of the optical axes univocally.

According to a tenth aspect and feature of the present invention, there is provided a lens unit comprising a composite lens system according to any of the first, eighth and ninth features, which is mounted in a mirror tube.

With the tenth feature of the present invention, it is possible to realize the lens unit comprising the composite lens system in which an axis-aligning adjustment for optical parts has been achieved easily and appropriately at a stage of fabrication of the composite lens system by bringing an adjusting member into engagement with adjusting faces, while conducting the positioning of the lenses in a direction of optical axes univocally.

According to an eleventh aspect and feature of the present invention, in addition to the tenth feature, only one of lenses of the composite lens system is press-fitted into the mirror tube.

With such arrangement, it is possible to realize the lens unit in which the aligning of the lenses to the mirror tube has been achieved easily.

According to a twelfth aspect and feature of the present invention, there is provided an image pickup device comprising a lens unit according to any of the tenth and eleventh features.

With such arrangement, it is possible to realize the image pickup device comprising the lens unit in which an axis-aligning adjustment for optical parts has been achieved easily and appropriately at a stage of fabrication of a composite lens system.

BRIEF DESCRIPTION OF THE DRAWINGS

FIG. 11 is a perspective view showing a second lens provided with a step by a padding treatment the first embodiment of the composite lens system according to the present invention;

FIG. 12 is a perspective view showing a first lens provided with a step by a padding treatment the first embodiment of the composite lens system according to the present invention;

DESCRIPTION OF THE PREFERRED EMBODIMENTS

A first embodiment of a composite lens system according to the present invention will now be described with reference to FIGS. 2 to 12.

Figure 2:
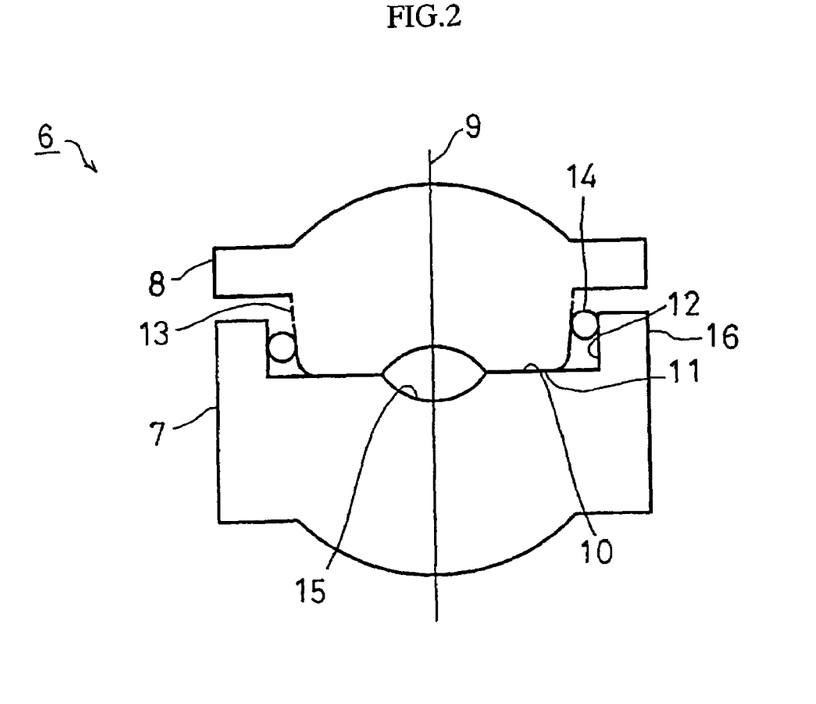
FIG. 2 is a vertical cross-sectional view showing a first embodiment of a composite lens system according to the present invention.

As shown in FIG. 2, a composite lens system 6 in the present embodiment includes two lenses 7 and 8 disposed so that they are adjacent to each other in a direction of an optical axis 9. One of the lenses, which is on the side of an object, is called a first lens 7, and the other lens which is on the side of an image surface is called a second lens 8.

The first lens 7 and the second lens 8 are positioned in the direction of the optical axis 9 in such a manner that optically non-functioning faces 10 and 11 perpendicular to the optical axis 9 are disposed to abut against each other.

The first lens 7 and the second lens 8 are formed with adjusting faces 12 and 13 used for axis-aligning adjustment of these lenses. The adjusting faces 12 and 13 are disposed so that angles formed by them with respect to the optical axis 9, i.e., angles formed by lines tangent to the adjusting faces 12 and 13 and lying on the same plane as the optical axis 9 with respect to the optical axis 9 (and so on) are different from each other.

In the present embodiment, the adjusting face 12 is formed into a vertical face parallel to the optical axis 9, as shown in FIG. 2, and the adjusting face 13 is formed into a tapered face decreased in diameter downwards, as shown in FIG. 2.

Further, the axis-aligning adjustment of the first lens 7 and the second lens 8 is achieved by an adjusting member 14 engaged with the adjusting faces 12 and 13 of both the lenses 7 and 8.

More specifically, the first lens 7 and the second lens 8 are moved relative to each other through the optically non-functioning faces 10 and 11 by inclining the adjusting member 14 (by changing the angle formed by both of the adjusting member 14 and the optical axis 9), so that optical axes of the first lens 7 and the second lens 8 are aligned with each other.

Here, the amount of lens moved is substantially proportional to the inclination of the adjusting member 14.

Therefore, it is possible to realize the composite lens system 6 including the lenses 7 and 8 with their axes aligned simply and appropriately with each other at the stage of fabrication of the composite lens system 6 by bringing the adjusting member 14 into engagement with the adjusting faces 12 and 13, while univocally carrying out the positioning of the lenses 7 and 8 in the direction of the optical axis 9 through the optically non-functioning faces 10 and 11 perpendicular to the optical axes 9 of the lenses 7 and 8. It should be noted that the optically non-functioning faces 10 and 11 are in direct abutment against each other in FIG. 2, but the present invention is not required to be limited to this, and the optically non-functioning faces 10 and 11 may be in indirect abutment against each other with another member (a diaphragm) perpendicular to the optical axis 9 being interposed therebetween.

If the inclination angles of the adjusting faces 12 and 13 are changed, the amount of lens moved in accordance with the inclination of the adjusting member 14 can be changed.

Each of the adjusting faces 12 and 13 may be not only a face such that an angle formed by a line tangent to each of the adjusting faces 12 and 13 and lying on the same plane as the optical axis 9 with respect to the optical axis 9 is always constant in the direction of the optical axis 9, but also a face such that the angle formed by the tangent line is sequentially changed in the direction of the optical axis 9. If the adjusting faces 12 and 13 are formed in the above manner, the amount of lens displaced in accordance with the inclination of the adjusting member 14 can be set appropriately in a manner other than the proportional manner, for example, in a quadratic function manner or in a stepwise manner.

Further, the composite lens system 6 in the present embodiment is constructed so that the adjusting member 14 is disposed in contact with both the contact faces 12 and 13 of the first lens 7 and the second lens 8.

Figure 3:
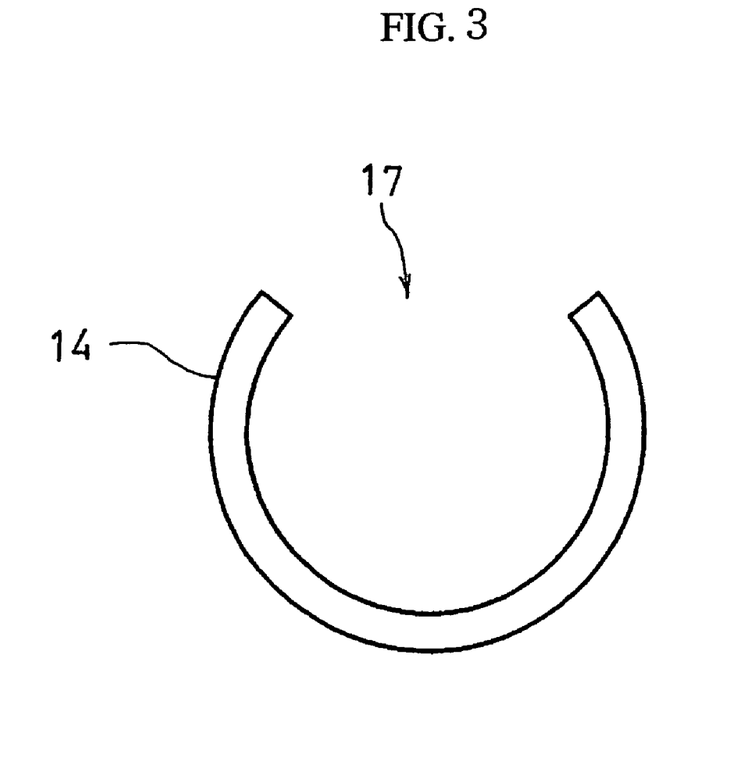
FIG. 3 is a plan view showing an annular member as an adjusting member in the first embodiment of the composite lens system according to the present invention.
Figure 4:
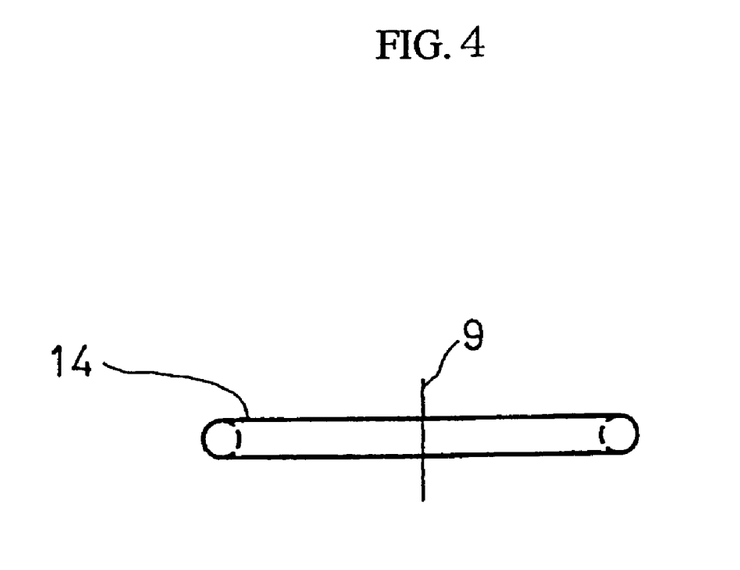
FIG. 4 is a side view of FIG. 3.

The adjusting member 14 is formed so that its sectional shape is circular, and its planar shape has an opening 17 in an annular portion, as shown in FIGS. 3 and 4.

This ensures that it is possible to facilitate the resilient deformation of the adjusting member 14 by a predetermined amount along the shapes of the adjusting faces 12 and 13 and hence, it is possible to carry out the axis-aligning adjustment of the optical parts 7 and 8 with a higher accuracy.

It is preferable that the adjusting member 14 is formed of a material having a resiliency such as a steel wire and a copper wire.

In addition, because the axis-aligning adjustment of the optical parts 7 and 8 can be carried out appropriately by adjusting the inclination of the adjusting member 14, the axis-aligning adjustment can be conducted further easily and inexpensively by a simple arrangement.

In the present embodiment, an extension 16 extending toward the second lens 8 along the optical axis 9 is formed outside an optically functioning face 15 of the first lens 7, and the adjusting face 12 of the first lens 7 is formed around an inner peripheral surface of the extension 16.

Further, at least a portion of an outer peripheral surface of the second lens 8 is located inside the extension 16, and the adjusting face 13 of the second lens 8 is formed on the outer peripheral surface at least at a site located inside the extension 16.

The adjusting member 14 is interposed between the adjusting face 12 of the first lens 7 and the adjusting face 13 of the second lens 8.

Thus, it is possible to more compact the composite lens system into a reduced outside diameter by forming the section of the adjusting member 14 perpendicular to a circumferential direction at a small size. It is preferable that the shape of the section of the adjusting member 14 perpendicular to the circumferential direction is circular, but provided that the adjusting member 14 is adapted to be brought into engagement with both of the adjusting faces 12 and 13, the adjusting member 14 may be of course formed into another shape.

Figure 5:
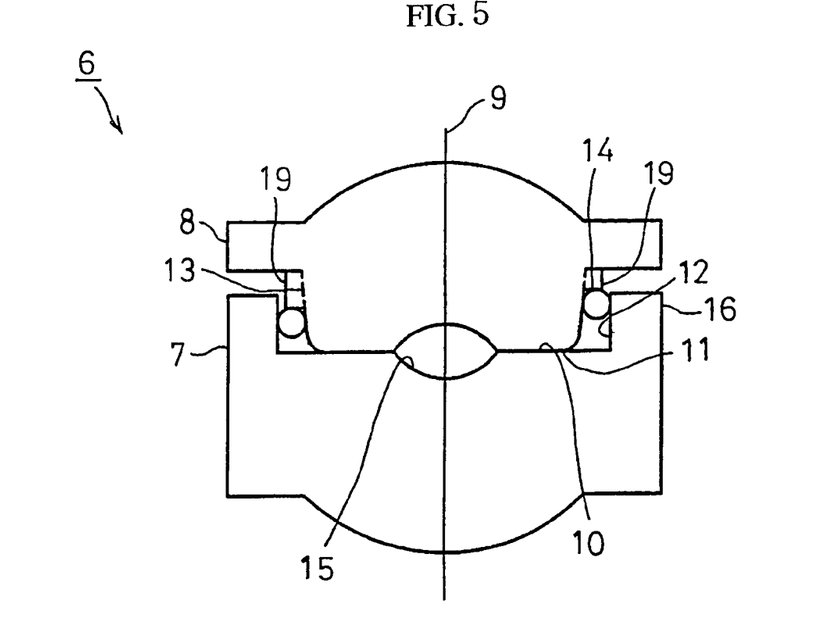
FIG. 5 is a vertical cross-sectional view showing another arrangement different from that shown in FIG. 2 in the first embodiment of the composite lens system according to the present invention.

To maintain the axis-aligned state achieved by the adjusting member 14, the adjusting member 14 and the adjusting faces 12 and 13 may be bonded to each other merely using an adhesive. The present invention is not limited to this bonding, and the axis-aligned state may be maintained stably, for example, by forming a rib 19 on the adjusting face 13 of the second lens 8 in a padding treatment, so that it is brought into contact with the adjusting member 14 in the direction of the optical axis, as shown in FIG. 5, and an adhesive may be further used. Alternatively, the axis-aligned state provided by the adjusting member 14 may be maintained by disposing a ring-shaped spacer separate from the lens 8 on the adjusting face 13.

Further, another important meaning of carrying out the padding treatment, for example, for forming the rib 19, is to realize a composite lens system 6 in which the axis-aligning adjustment can be carried out univocally.

More specifically, when an offset amount between optical axes 9 peculiar to lens-producing conditions in a mold or the like for forming the lenses 7 and 8 can be defined, for example, using a statistical technique, if the offset amount between the optical axes 9 of the lenses 7 and 8 under such producing conditions is once defined using the adjusting member 14, the defined offset amount can be used, as it is, for the composite lens system 6 comprising the first lens 7 and the second lens 8 formed under the same producing conditions.

Therefore, after definition of the offset amount, by subjecting the lenses 7 and 8 to the padding treatment for compensating for the offset amount previously rather than after the axis-aligning adjustment, or by disposing the spacer separate from the lenses 7 and 8 for compensating for the offset amount on the adjusting faces 12 and 13, it is possible to achieve the axis-aligning adjustment univocally only by placing the adjusting member 14 in a predetermined position between the adjusting faces 12 and 13.

In this case, the position in which the adjusting member 14 is placed may be determined, for example, by determining a particular site of the adjusting member 14 such as the opening 17 as a reference and previously detecting that the particular site as the reference will be determined in what position in a circumferential direction between the adjusting faces 12 and 13 at the time of the axis-aligning adjustment (at the time of definition of the offset amount). The present invention is not limited to this, and the position in which the adjusting member 14 is placed may be determined by determining a particular site such as a gate for each of the lenses 7 and 8 in the formation of them in a mold as a reference and previously detecting that what portion of the adjusting member 14 will be placed at the particular site as the reference.

With such arrangement, it is possible to further enhance the efficiency of production of the composite lens system 6.

Figure 6:
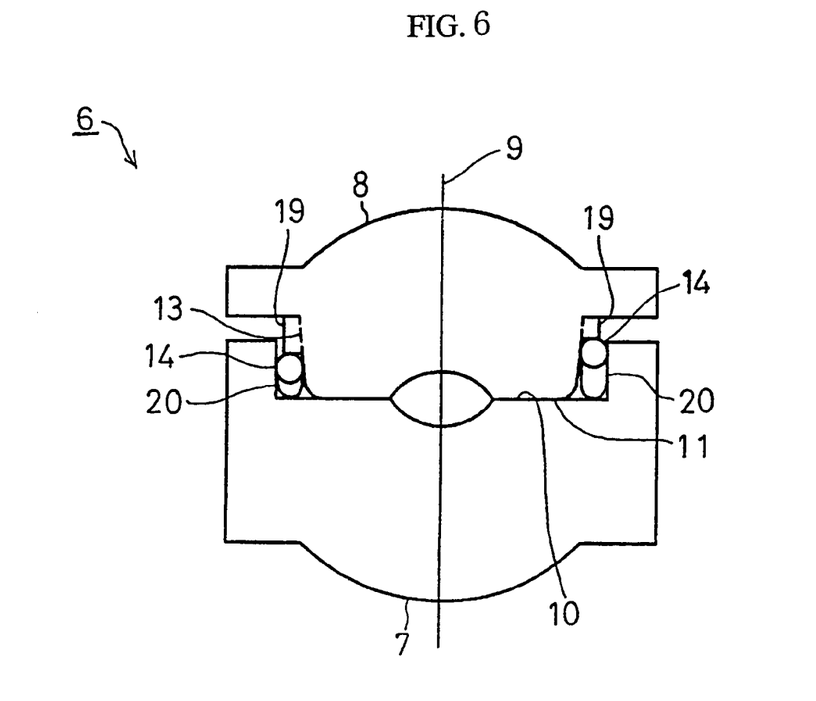
FIG. 6 is a vertical cross-sectional view showing a yet other arrangement different from those shown in FIGS. 2 and 5 in the first embodiment of the composite lens system according to the present invention.
Figure 7:
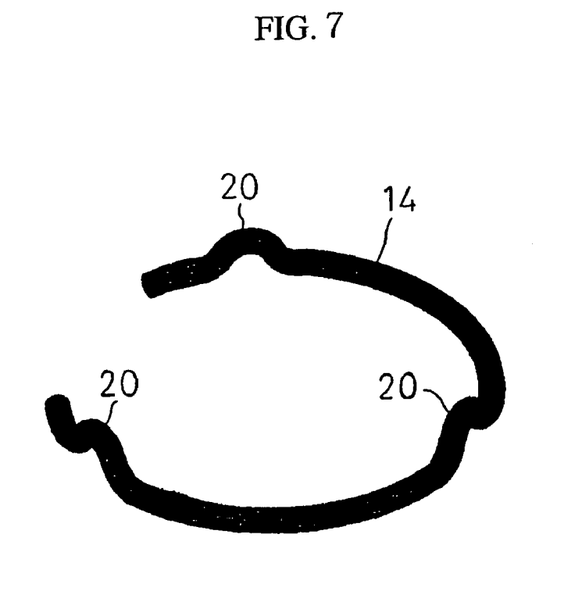
FIG. 7 is a perspective view showing another form of an annular member different from that shown in FIG. 3 in the first embodiment of the composite lens system according to the present invention.

Further, a projection 20 may be provided on the adjusting member 14 to abut against that portion of the optically non-functioning face 11 of the first les 11, which faces the adjusting member 14, as shown in FIGS. 6 and 7.

With such arrangement, as in the case where the rib 19 is provided, if an offset amount between the optical axes 9 peculiar to the conditions for producing the lenses 7 and 8 can be defined, then it is possible, in the subsequent producing step, after the offset amount of the optical axes 9 of the lenses 7 and 8 under the producing conditions has been once defined using the adjusting member 14 (which is not provided with the projection 20), to univocally achieve the axis-aligning adjustment by only locating the regulating member 14 having the projection 20 formed thereon for compensating for the offset amount in a predetermined position between the adjusting faces 12 and 13.

Although not illustrated, the direction of the projection 20 on the adjusting member 14 may be opposite from that shown in FIG. 6. Even in this case, the offset amount between the optical axes can be compensated for by bringing the projection 20 into abutment against that portion of the optically non-functioning face 11 of the second lens 8 which faces the adjusting member 14, and thus, it is possible to univocally achieve the axis-aligning adjustment, as in the example shown in FIG. 6.

Alternatively, the adjusting member 14 may be removed from between the adjusting faces 12 and 13 after bonding of the optical parts 7 and 8, or may be used to the bitter end only when the offset amount between the optical axes 9 is defined. In an actual mass production stage, a composite lens system provided with no adjusting member 14 in a final product-finished state can be produced by providing another member for compensating for the offset amount between the adjusting faces 12 and 13.

A process for producing the composite lens system 6 in the present embodiment will now be described.

Figure 8:
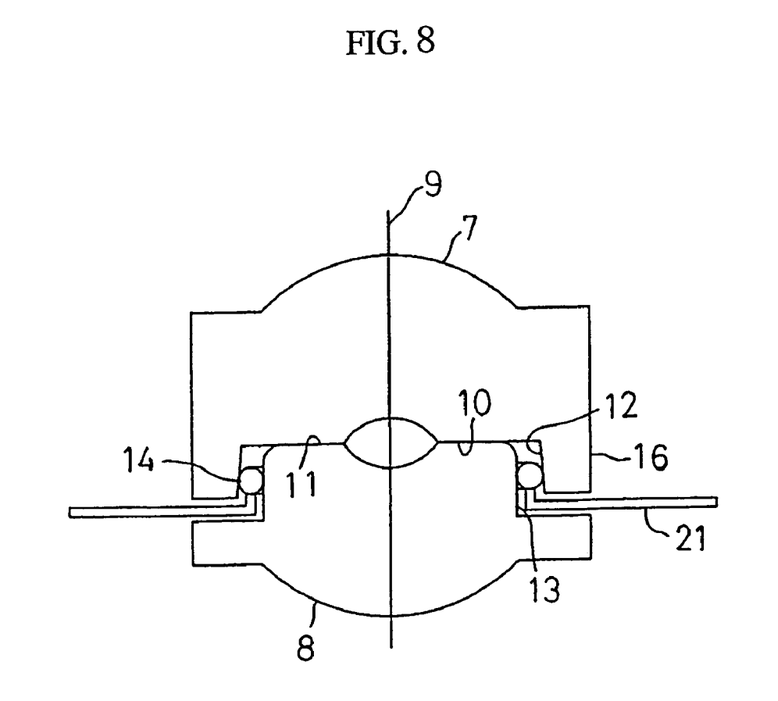
FIG. 8 is a vertical cross-sectional view showing a step of placing an adjusting member and a first lens onto a second lens in a process for producing the first embodiment of the composite lens system according to the present invention.

First, as shown in FIG. 8, a second lens 8 is fixed with its adjusting face 13 turned upwards; a jug 21 is placed on the second lens 8 to surround the adjusting face 13; and an adjusting member 14 is placed onto the jig 21.

In this state, a first lens 7 is placed with its adjusting face 12 turned downwards onto the second lens 8.

At this time, optically non-functioning faces 10 and 11 of the first lens 7 and the second lens 8 perpendicular to an optical axis 9 are put into abutment against each other, whereby the positioning of the lenses 7 and 8 in a direction of the optical axis 9 is achieved univocally.

Figure 9:
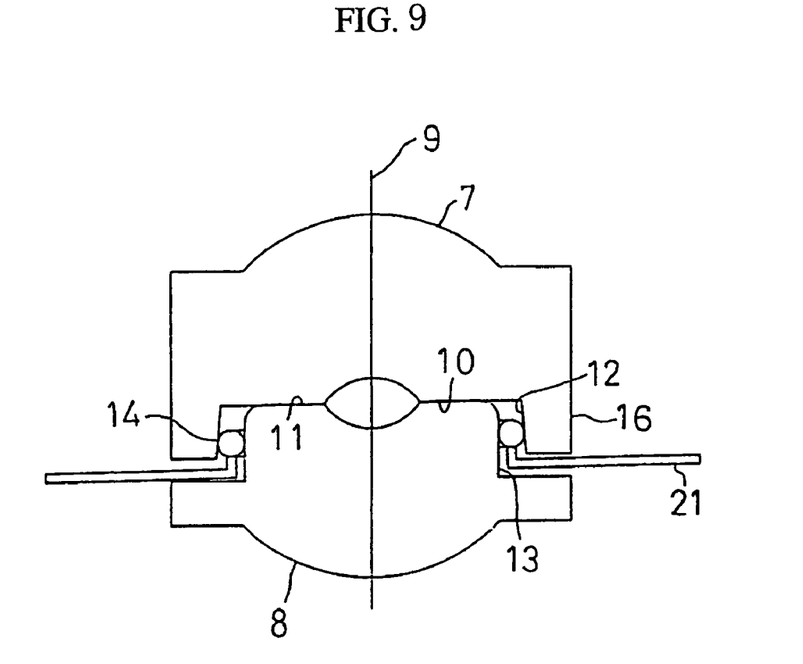
FIG. 9 is a vertical cross-sectional view showing a step of aligning axes of the lenses in the process for producing the first embodiment of the composite lens system according to the present invention.

Then, the first lens 7 is moved in a direction perpendicular to the optical axis 9 by changing the inclination of the adjusting member 14 using the jig 21, as shown in FIG. 9.

At this time, the axis-aligning adjustment of the first lens 7 and the second lens 8 is achieved by adjusting the inclination of the adjusting member 14, so that the optical axes 9 of the lenses 7 and 8 are aligned with each other, while checking the offset between the optical axes of the lenses 7 and 8 using an optical technique such as a resolving chart, which has output an image-formed state provided by the first and second lenses 7 and 8.

At this time, a fitting degree is adjusted in addition to the axis-aligning adjustment by the vertical movement of the adjusting member 14 between the adjusting faces 12 and 13 of the first lens 7 and the second lens 8, whereby the first lens 7 and the second lens 8 are fitted to each other at a proper fitting degree with the adjusting member 14 interposed therebetween.

After completion of the axis-aligning adjustment, an adhesive is poured into between the adjusting faces 12 and 13 to bond the adjusting faces 12 and 13 to each other, or in addition to an adhesive, a rib 19 for maintaining the axis-aligned state is formed on the adjusting face 13 by a padding treatment, as shown in FIG. 5, thereby completing the production of the composite lens system 6.

Another process for producing a composite lens system 6 in the present embodiment will be described below.

The process which will be described below is premised on an assumption that an offset amount between optical axes 9 peculiar to lens-producing conditions in a mold or the like for producing a composite lens system 6 can be defined using a statistical technique or the like.

Under such an assumption, first of all, an axis-aligning adjustment as shown in FIGS. 8 and 9 is carried out for a first lens 7 and a second lens 8 produced under predetermined producing conditions, and an offset amount between optical axes under the producing conditions is defined on the basis of the inclination and the position of an adjusting member 14 in a state after conduction of the axis-aligning adjustment.

In this case, a position for placement of the adjusting member 14 relative to the first and second lenses 7 and 8 is determined in advance, for example, by determining a particular site of the adjusting member 14 (e.g., an opening 17 or the like) as a reference and previously detecting that the particular site as the reference will be placed in what position in a circumferential direction between the adjusting faces 12 and 13.

Then, a composite lens system 6 is produced using a first lens 7 and a second lens 8 produced under the same producing conditions as for the lenses 7 and 8, the offset amount between optical axes 9 of which has been defined.

Figure 10:
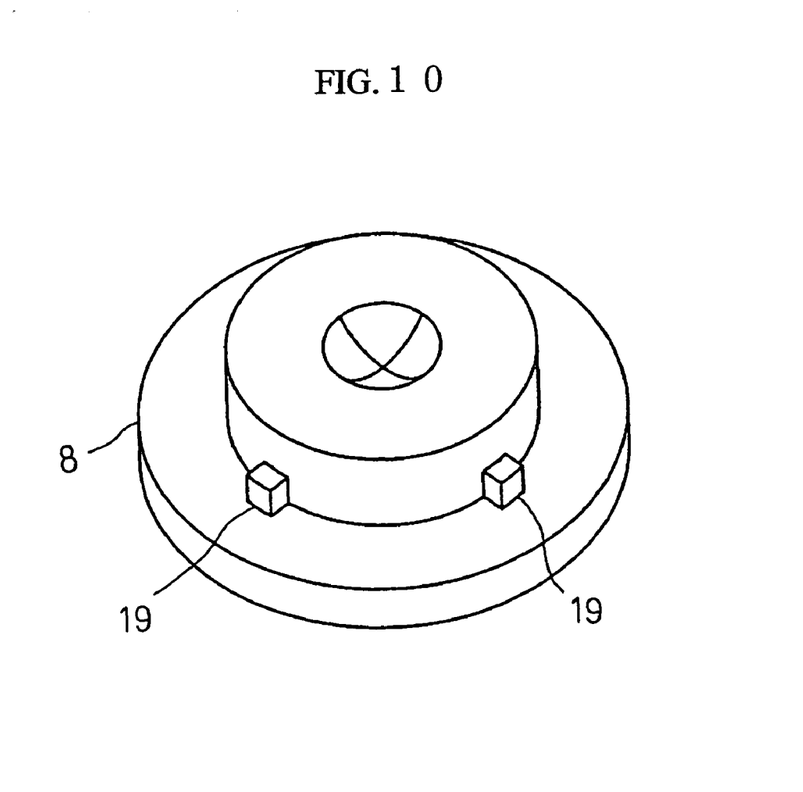
FIG. 10 is a perspective view showing a second lens provided with a rib by a padding treatment the first embodiment of the composite lens system according to the present invention.

In this case, a rib 19 for compensating for the offset amount is previously formed on the adjusting face of the second lens 8 by a padding treatment, as shown in FIG. 10, or steps 22 are previously formed on the adjusting face 13 of the second lens 8 and the adjusting face 12 of the first lens 7 by a padding treatment, respectively, as shown in FIGS. 11 and 12.

The present invention is not limited to these examples, and a projection 20 for compensating for the offset amount between the optical axes 9 as shown in FIG. 7 may be previously formed on the adjusting member 14.

Then, the adjusting member 14 is placed onto the second lens 8 which has been subjected to the padding treatment. In this case, the adjusting member is placed so that it is located in a position relative to the second lens 8 which has been predetermined in the axis-aligning adjustment.

Then, the first lens 7 is placed onto the second lens 8 having the adjusting member 14 placed thereon. In this case, the first lens 7 is placed so that the adjusting member 14 is located in a position relative to the first lens 7 which has been predetermined in the axis-aligning adjustment.

If the placements are conducted in the above manner, the axis-aligning adjustment can be achieved univocally only by merely locating the adjusting member 14 in the predetermined position between the adjusting faces 12 and 13 of the second lens 8 and the first lens 7.

As a result, it is possible to enhance the efficiency of production of the composite lens system 6.

A second embodiment of a composite lens system 6 according to the present invention will now be described with reference to FIGS. 13 to 15.

In the second embodiment, portions or components in a basic arrangement identical or similar to those in the first embodiment are designated by like reference characters.

In a composite lens system 25 in the second embodiment, an adjusting member 14 is similar to that in the above-described first embodiment.

In the second embodiment, however, the forms of adjusting faces 28 and 29 of a first lens 26 and a second lens 27 and how the adjusting member 14 is engaged with the adjusting faces 28 and 29 are different from those in the first embodiment.

Figure 13:
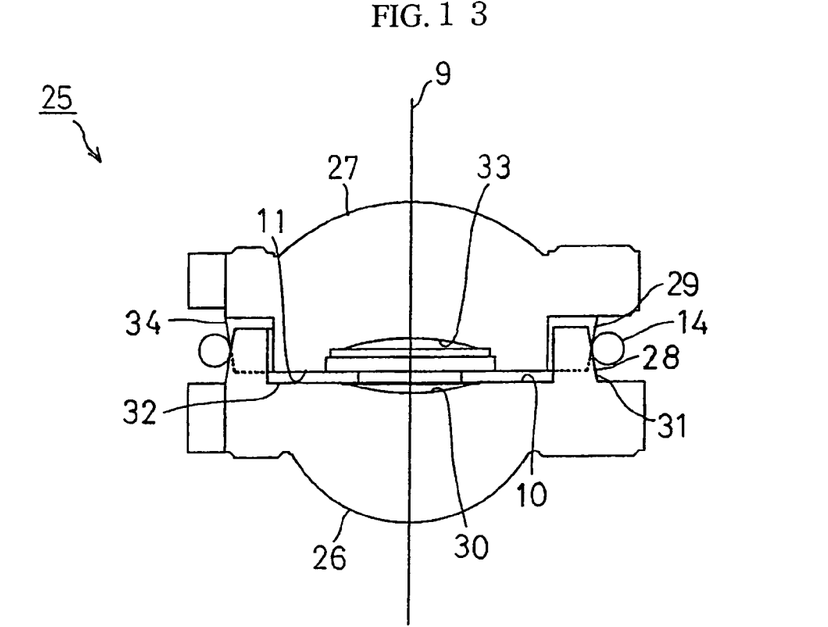
FIG. 13 is a vertical cross-sectional view showing a second embodiment of a composite lens system according to the present invention.
Figure 15:
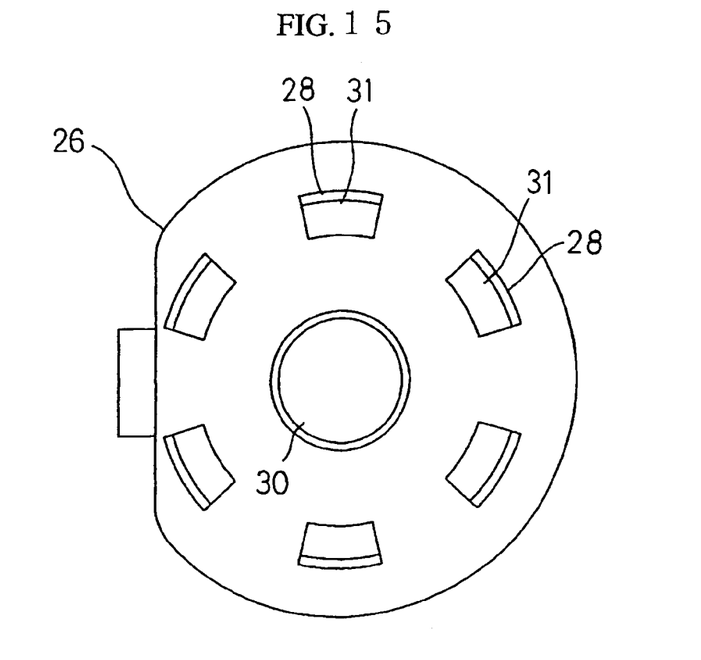
FIG. 15 is a plan view of a first lens in the second embodiment of the composite lens system according to the present invention.

More specifically, as shown in FIGS. 13 and 15, a plurality of extensions 31 are formed at predetermined distances circumferentially from one another on the first lens 26 outside an optically functioning face 30 to extend toward the second lens 27 along an optical axis 9, and adjusting faces 28 of the first lens 26 are formed on outer peripheral surfaces of these extensions 31. Each of the adjusting faces 28 is formed as a face such that the distance in a diametrical direction perpendicular to the optical axis 9 between such face and the optical axis 9 is decreased gradually as proceeding upwards, as viewed in section in FIG. 13.

Figure 14:
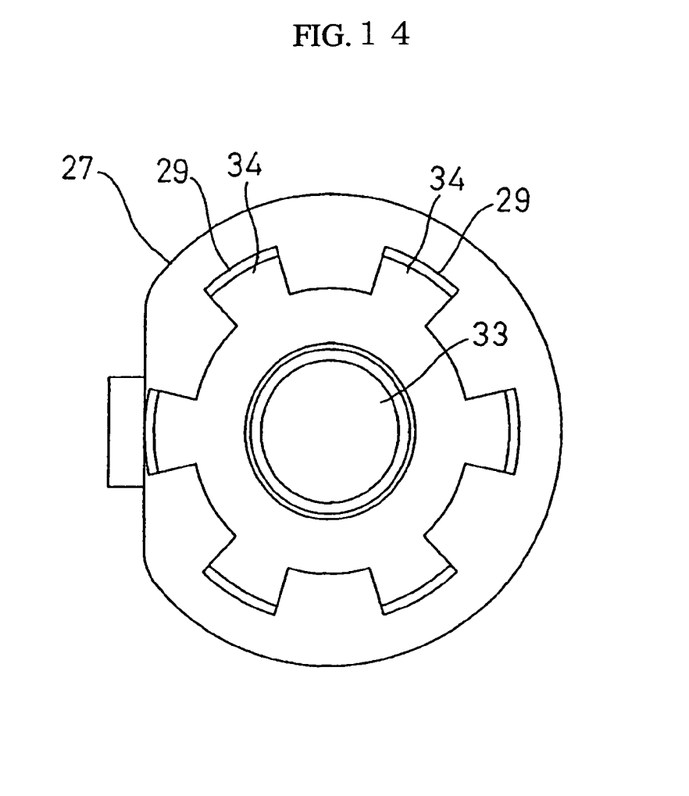
FIG. 14 is a bottom view of a second lens in the second embodiment of the composite lens system according to the present invention.

On the other hand, as shown in FIGS. 13 and 14, a plurality of projecting edges 34 are formed on the second lens 27 outside an optically functioning face 33 and each located between the adjacent extensions 31 of the first lens 26, and adjusting faces 29 of the second lens 27 are formed around outer peripheral surfaces of the projecting edges 34. Each of the adjusting faces 29 is formed as a face such that the distance in the diametrical direction perpendicular to the optical axis 9 between such face and the optical axis 9 is decreased gradually as proceeding upwards, as viewed in section in FIG. 13.

The adjusting faces 28 of the first lens 26 and the adjusting faces 29 of the second lens 27 are formed so that angles formed by the adjusting faces 28 and 29 with respect to the optical axes 9 are different from each other.

An optical axis-aligning adjustment is achieved between the first and second lenses 26 and 27 by fitting the adjusting member 14 around outer peripheral surfaces of the adjusting faces 28 of the first lens 26 and the adjusting faces 29 of the second lens 27.

Thus, it is possible to maintain stresses applied to the lenses 26 and 27 uniformly by the adjusting member 14 and to achieve the stable axis-aligning adjustment.

It should be noted that even in the second embodiment, the axis-aligning adjustment can be achieved univocally by subjecting the adjusting faces 28 and 29 to a padding treatment, or by disposing a spacer separate from the lenses, or by forming a projection 20 on the adjusting member 14, as in the first embodiment.

In FIG. 13, the optically non-functioning face 10 perpendicular to the optical axis 9 of the first lens 26 and the optically non-functioning face 11 perpendicular to the optical axis 9 of the second lens 27 are formed in indirect abutment against each other with a diaphragm 32 interposed, but the diaphragm 32 may be disposed as required.

Figure 16:
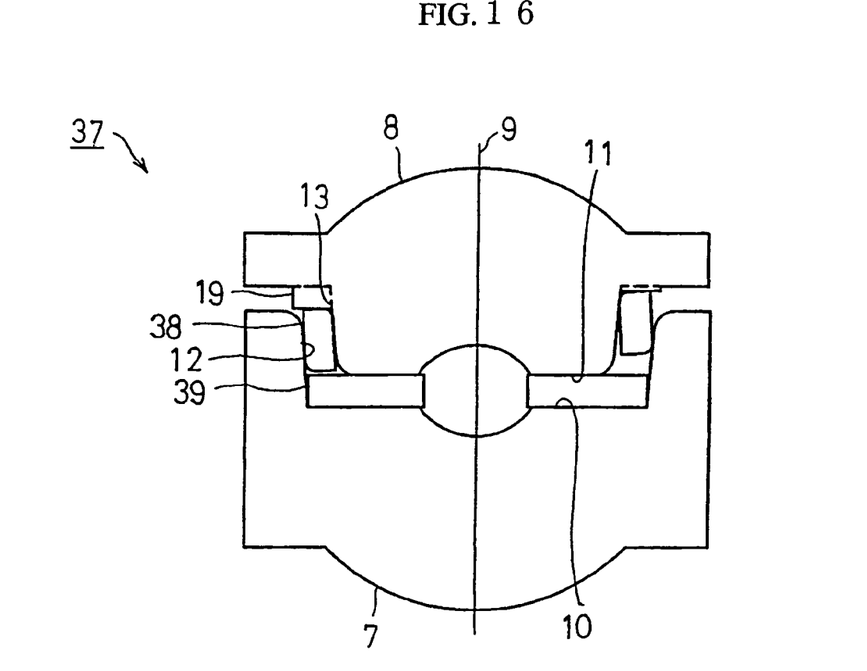
FIG. 16 is a vertical cross-sectional view showing a third embodiment of a composite lens system according to the present invention.

FIG. 16 shows a third embodiment of a composite lens system according to the present invention.

The third embodiment will be described below using like reference characters for portions or components in a basic arrangement identical or similar to those in the first embodiment.

In a composite lens system 37 in the third embodiment, forms of adjusting faces 12 and 13 of a first lens 7 and a second lens 8 are similar to those in the first embodiment.

In the third embodiment, however, an adjusting member is a sleeve 38 surrounding the adjusting face 13 of the second lens 8.

It is preferable that the sleeve 38 is rectangular in sectional shape and annular in planar shape with an opening provided in part. A diaphragm 39 is disposed between optically non-functioning faces 10 and 11 of the first and second lens 7 and 8 perpendicular to optical axes 9 to extend perpendicular to optical axes 9. The optically non-functioning faces 10 and 11 of the lenses 7 and 8 are formed in indirect abutment against each other with the diaphragm 39 interposed therebetween, whereby the positioning of the lenses 7 and 8 in a direction of the optical axes are achieved. It should be noted that the diaphragm 39 may be disposed as required.

Even in this case, the axis-aligning adjustment for the optical parts 7, 8 and 39 can be achieved by adjusting the inclination of the sleeve 38. Therefore, it is possible to achieve the axis-aligning adjustment easily and inexpensively by a simple arrangement.

Even in the third embodiment, the axis-aligning adjustment can be achieved univocally by subjecting the adjusting face 13 to a padding treatment or by another means, as in the first embodiment.

A first embodiment of a lens unit according to the present invention will now be described with reference to FIG. 17.

A lens unit in this embodiment comprises a composite lens system 6 similar to that in the above-described first embodiment, which is mounted on a mirror tube 42. An optical axis of the composite lens system 6 and a center axis of the mirror tube 42 are aligned with each other.

In the composite lens system 6 mounted in the lens unit 41, the axis-aligning adjustment has been already completed at a stage of fabrication of the composite lens system 6, as described above.

As a result, if only one of lenses (a first lens in FIG. 17) of the composite lens system 6 is press-fitted into the mirror tube 42, while aligning the optical axis 9 and the center axis of the mirror tube 42 with each other, all the optical axes 9 of the optical parts 7 and 8 constituting the composite lens system 6 can be aligned with the center axis of the mirror tube 42.

An optically non-functioning face 10 of the first lens 7 perpendicular to the optical axis 9 and an optically non-functioning face 11 of the second lens 8 perpendicular to the optical axis 9 are formed in indirect abutment against each other with a diaphragm 45 perpendicular to the optical axis being interposed therebetween. It should be noted that the diaphragm 45 may be disposed as required.

Figure 17:
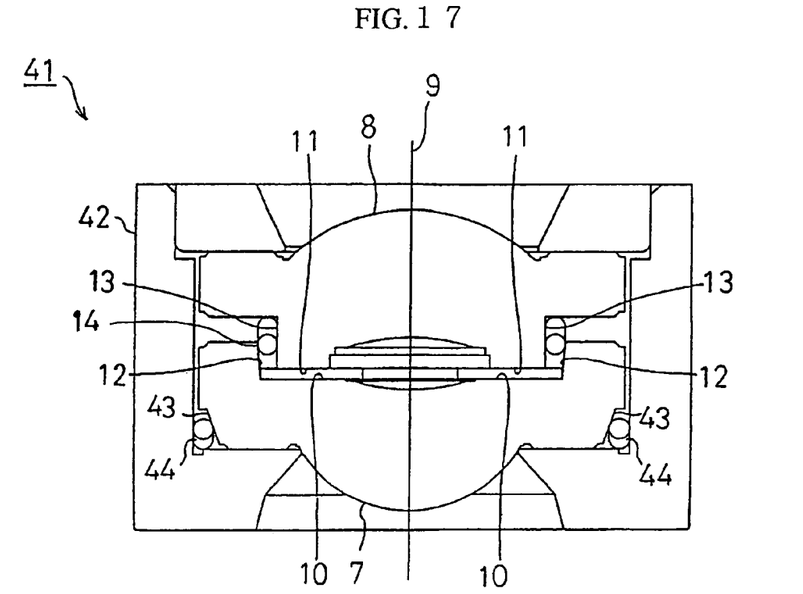
FIG. 17 is a vertical cross-sectional view showing a second embodiment of a lens unit according to the present invention.

In FIG. 17, a slant 43 for aligning the axes of the composite lens system 6 and the mirror tube 42 with each other is formed at a lower end of an outer peripheral surface of the first lens 7, and an adjusting member 44 for the alignment (for example, a member having a resiliency such as a spring) is interposed between the slant 43 and an opposed surface of the mirror tube 42. Of course, the alignment of the axes of the composite lens system 6 and the mirror tube 42 with each other may be achieved by another technique.

Figure 18:
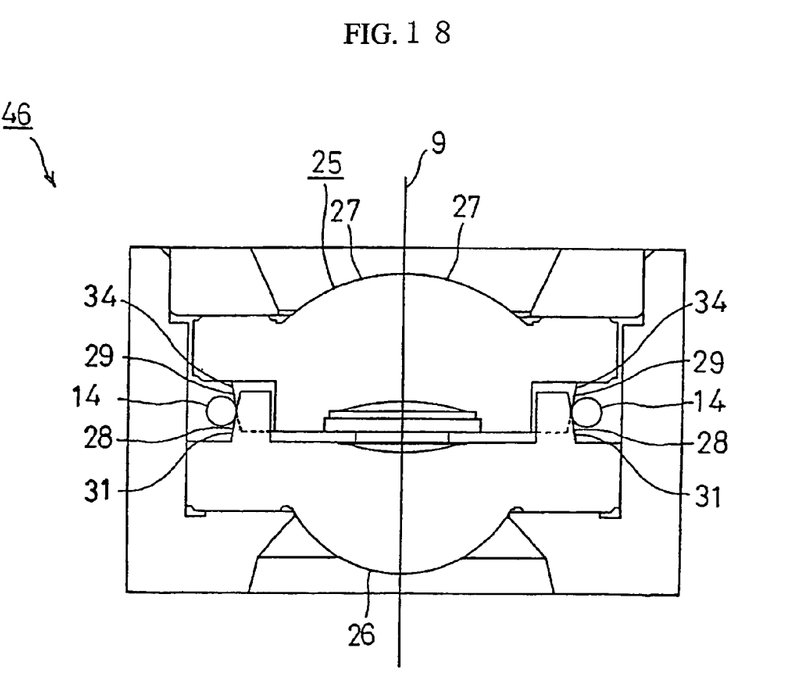
FIG. 18 is a vertical cross-sectional view showing a first embodiment of a lens unit according to the present invention.

FIG. 18 shows a second embodiment of a lens unit according to the present invention.

This lens unit 43 comprises a composite lens system 25 similar to that in the above-described second embodiment (which has a projection 20 on an adjusting member 14 in FIG. 18) which is mounted in a mirror tube 47. Axes of the composite lens system 25 and the mirror tube 47 are aligned with each other. A diaphragm 45 is disposed as required between the first lens 26 and the second lens 27.

Even in this embodiment, the axis-aligning adjustment has been already achieved at a stage of fabrication of the composite lens system 25, as in the embodiment shown in FIG. 17. In the lens unit 43 shown in FIG. 8, the alignment of all the axes of the composite lens system 25 and the center axis of the mirror tube 47 is achieved univocally by press-fitting only one 26 of the lenses into the mirror tube 47, while aligning the optical axis 9 of the lens 26 with the center axis of the mirror tube 47. As a result, it is possible to enhance the efficiency of production of the lens unit 43.

An image pickup device comprising a lens unit 41 or 46 as shown in FIG. 17 or 18 or a lens unit having a composite lens system 37 as shown in FIG. 16 and accommodated in a mirror tube along with other parts such as image pickup elements can exhibits a good optical performance, because the alignment of axes of optical portions of the composite lens system 6, 35 or 37 with each other and the alignment of the axis of the composite lens system 6, 35 or 37 and the axis of the mirror tube 42 have been achieved appropriately.

The present invention is not limited to the above-described embodiments, and various modifications may be made as required.

For example, the present invention is applicable effectively to a composite lens system including three or more lenses.

In the lens arrangements shown in FIGS. 13 and 18, the adjusting member may be a sleeve. Even in this case, stresses applied to the lenses can be maintained uniformly by the adjusting member, as in the composite lens system shown in FIG. 13. Thus, the more stable axis-aligning adjustment can be achieved, and the alignment of the axes of the composite lens system and the mirror tube with each other can be achieved univocally, as in the lens unit 46 shown in FIG. 18.

Figure 19:
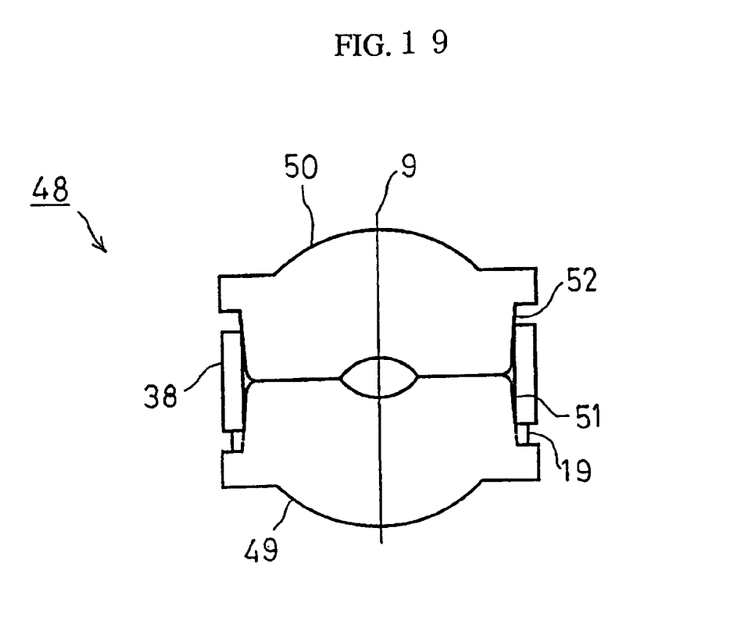
FIG. 19 is a vertical cross-sectional view showing another embodiment of a composite lens system.
Figure 20:
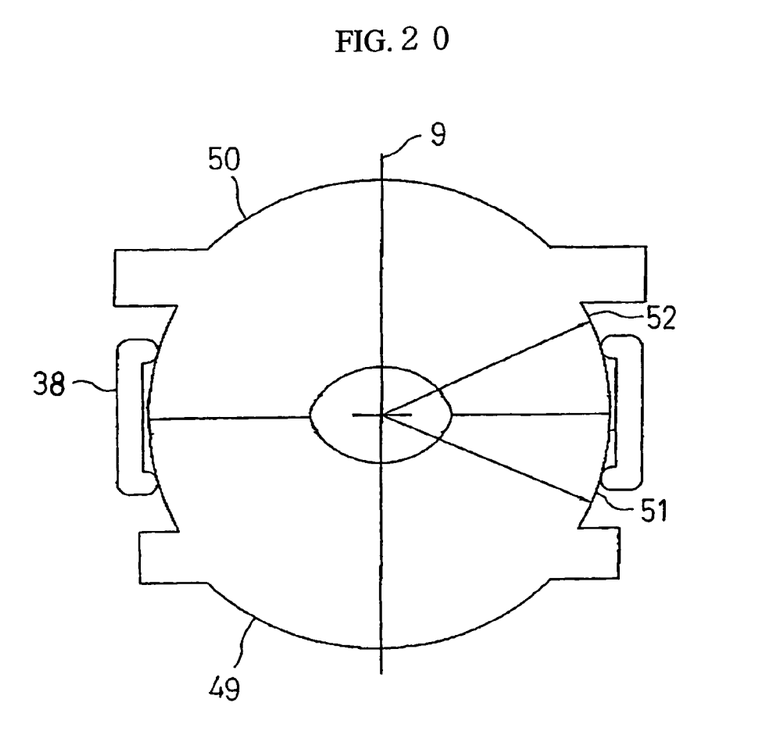
FIG. 20 is a vertical cross-sectional view showing an embodiment of a composite lens system which is not employed in the present invention.
Figure 21:
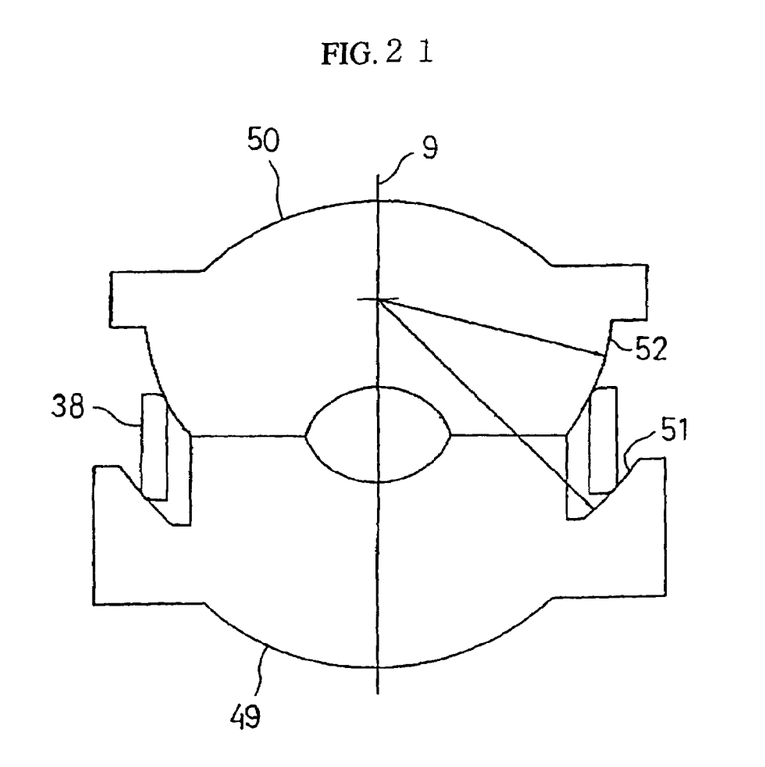
FIG. 21 is a vertical cross-sectional view showing another embodiment, different from FIG. 20, of a composite lens system which is not employed in the present invention.

Further, the composite lens system may be a composite lens system 48 comprising a first lens 49 and a second lens 50 which are disposed to abut against each other with their outer peripheral surfaces fitted into a sleeve 38, as shown in FIG. 19. Even in this case, the axis-aligning adjustment can be achieved easily by adjusting the angle of the sleeve. In the composite lens system 48 shown in FIG. 19, it is not necessarily required that angles formed by adjusting faces 51 and 52 of adjacent lenses 49 and 50 with respect to optical axes 9 are different from each other. A composite lens system may be not of an arrangement in which adjusting faces 51 and 52 as shown in FIGS. 20 and 21 are located on concentric spherical planes having the same center of curvature on optical axes. In this case, a composite inclined face with different angles formed by its portion fitted to a first lens 49 and by its portion fitted to the second lens 50 with respect to the optical axis may be formed on an inner peripheral surface of a sleeve 38, so that the alignment of axes of the lenses 49 and 50 with each other may be achieved using the composite inclined face.

Figure 22:
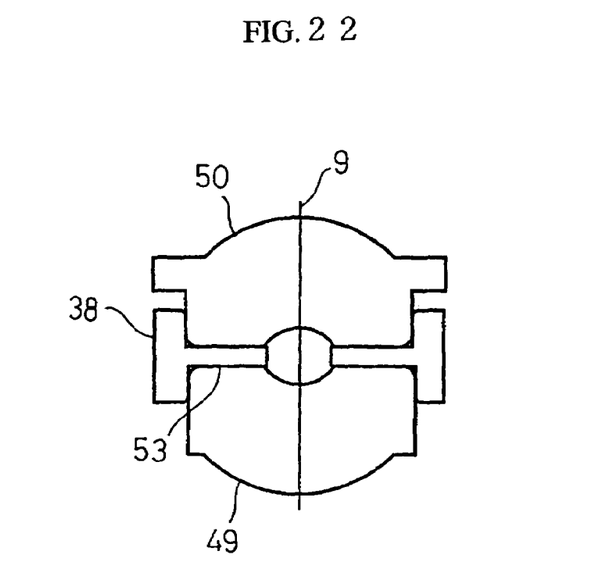
FIG. 22 is a vertical cross-sectional view showing a further embodiment of a composite lens system.

A composite lens system may be of an arrangement in which a diaphragm 53 is formed integrally on a sleeve 38, and a first lens 49 and a second lens 50 are disposed to abut against each other with the diaphragm 53 interposed therebetween, the sleeve 38 having a shape such that its center axes at one end and the other end in a direction of an optical axis are offset from each other.

In this case, the lenses 49 and 50 can be rotated eccentrically relative to each other about the optical axes 9 (in a-circumferential direction of the lenses) in a state in which they are in abutment against each other with the diaphragm 53 interposed therebetween, and the alignment of the axes of the optical parts with each other can be achieved with this eccentric rotation.

What is claimed is:

1. A composite lens system comprising a plurality of lenses which are disposed adjacent one another in a direction of their optical axes aligned with one another by an axis-aligning adjustment, wherein adjacent two of said plurality of lenses have optically non-functioning faces which are formed thereon to abut against each other directly or with another member interposed therebetween, whereby the positioning of said adjacent lenses in the direction of the optical axes is achieved, and said plurality of lenses have adjusting faces which are formed thereon, so that angles formed by said adjacent lenses with respect to the optical axes are different from each other, and which are used for an axis-aligning adjustment for said adjacent lenses, and an adjusting member disposed to engage both the adjusting faces of said adjacent lenses for providing said axis-aligning adjustment by inclining said adjustment member.

2. The composite lens system according to claim 1, wherein one of said adjacent lenses has an extension formed thereon outside its optically functioning face to extend toward the other of said adjacent lenses along the optical axis; said adjusting face of said one lens is formed around an inner peripheral surface of said extension; at least a portion of an outer peripheral surface of said other lens is located inside said extension; the adjusting face of said other lens is formed at least at a portion of said outer peripheral surface inside said extension; and said adjusting member is interposed between the adjusting face of said one lens and the adjusting face of said other lens.

3. A composite lens system comprising a plurality of lenses which are disposed adjacent one another in a direction of their optical axes aligned with one another by an axis-aligning adjustment, wherein adjacent two of said plurality of lenses have optically non-functioning faces which are formed thereon to abut against each other directly or with another member interposed therebetween, whereby the positioning of said adjacent lenses in the direction of the optical axes is achieved, and said plurality of lenses have adjusting faces which are formed thereon, so that angles formed by said adjacent lenses with respect to the optical axes are different from each other, and which are used for an axis-aligning adjustment for said adjacent lenses, said axis-aligning adjustment being achieved by an adjusting member disposed to engage both the adjusting faces of said adjacent lenses; and one of said adjacent lenses has a plurality of extensions formed thereon outside its optically functioning face at predetermined distances circumferentially from one another to extend toward the other of said adjacent lenses along the optical axis; adjusting faces of said one lens are formed on outer peripheral surfaces of these extensions; a plurality of projecting edges are formed on said other lens outside its optically functioning face and each located between the adjacent extensions of said one lens; adjusting faces of said other lens are formed around outer peripheral surfaces of said projecting edges; and said adjusting member is fitted around outer peripheral surfaces of the adjusting faces of said one lens and the adjusting faces of said other lens.

4. The composite lens system according to any one of claims 1 to 3, wherein said adjustment member is an annular member disposed in contact with both said adjacent lenses.

5. The composite lens system according to any one of claims 1 to 3, wherein said adjusting member is a sleeve disposed in contact with both the adjusting faces of said adjacent lenses.

6. The composite lens system according to any one of claims 1 to 3, wherein said adjusting member has a projection disposed to abut against that portion of the optically non-functioning face of the lens perpendicular to the optical axis, which faces said adjusting member.

7. The composite lens system according to any one of claims 1–3, wherein said adjusting member is annular in planar shape with an opening provided in part.

8. A composite lens system comprising a plurality of lenses which are disposed adjacent one another in a direction of their optical axes aligned with one another by an axis-aligning adjustment, wherein said plurality of lenses are positioned in the direction of the optical axes of the adjacent tenses by bringing optically non-functioning faces of said adjacent lenses into abutment against each other directly or indirectly with another member interposed therebetween, and have adjusting faces formed thereon and used for the axis-aligning adjustment for said adjacent lenses, and a sleeve engaged with both the adjusting faces of said adjacent lenses for providing said axis-aligning adjustment by inclining said sleeve.

9. A lens unit comprising a composite lens system according to any one of claims 1 and 8, which is mounted in a mirror tube.

10. The lens unit according to claim 9, wherein only one of lenses of said composite lens system is press-fitted into the mirror tube.

11. An image pickup device comprising a lens unit according to claim 9.

12. The composite lens system according to claim 5, wherein said adjusting member is annular in planar shape with an opening provided in part.

13. The composite lens system according to claim 6, wherein said adjusting member is annular in planar shape with an opening provided in part.

14. The composite lens system according to claim 4, wherein said adjusting member has a projection disposed to abut against that portion of the optically non-functioning face of the lens perpendicular to the optical axis which faces said adjusting member.

15. The composite lens system according to claim 4, wherein said adjusting member is annular in planar shape with an opening provided in part.

16. A image pickup device comprising a lens unit according to claim 10.

* * * * *